(12) United States Patent
Budni

(10) Patent No.: US 9,261,723 B1
(45) Date of Patent: Feb. 16, 2016

(54) REDUCING VISIBILITY OF INTER-SCREEN GAP IN TILED DISPLAY SYSTEMS

(75) Inventor: Anand Budni, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 1042 days.

(21) Appl. No.: 12/364,490

(22) Filed: Feb. 2, 2009

Related U.S. Application Data

(60) Provisional application No. 61/025,710, filed on Feb. 1, 2008.

(51) Int. Cl.
 *G09G 5/00* (2006.01)
 *G02F 1/133* (2006.01)
 *G02F 1/1333* (2006.01)
 *G02F 1/1335* (2006.01)

(52) U.S. Cl.
 CPC ...... *G02F 1/13336* (2013.01); *G02F 1/133512* (2013.01); *G02F 1/133524* (2013.01)

(58) Field of Classification Search
 None
 See application file for complete search history.

(56) References Cited

U.S. PATENT DOCUMENTS

| | | | | |
|---|---|---|---|---|
| 6,128,131 | A * | 10/2000 | Tang | 359/443 |
| 6,483,482 | B1 * | 11/2002 | Kim | 345/3.1 |
| 6,611,241 | B1 * | 8/2003 | Firester et al. | 345/1.3 |
| 6,999,045 | B2 * | 2/2006 | Cok | 345/1.3 |
| 7,239,367 | B2 * | 7/2007 | Jin et al. | 349/159 |
| 7,489,286 | B2 * | 2/2009 | Kawase et al. | 345/1.1 |
| 7,697,183 | B2 | 4/2010 | Malyak et al. | |
| 2006/0012733 | A1 * | 1/2006 | Jin et al. | 349/73 |
| 2008/0291140 | A1 | 11/2008 | Kent et al. | |

* cited by examiner

*Primary Examiner* — William Boddie
*Assistant Examiner* — Alecia D English
(74) *Attorney, Agent, or Firm* — Fish & Richardson P.C.

(57) ABSTRACT

Techniques and display systems that provide a tile display screen made up by adjacent constituent screens with a reduced level of visibility of a gap between two adjacent constituent screens.

16 Claims, 9 Drawing Sheets

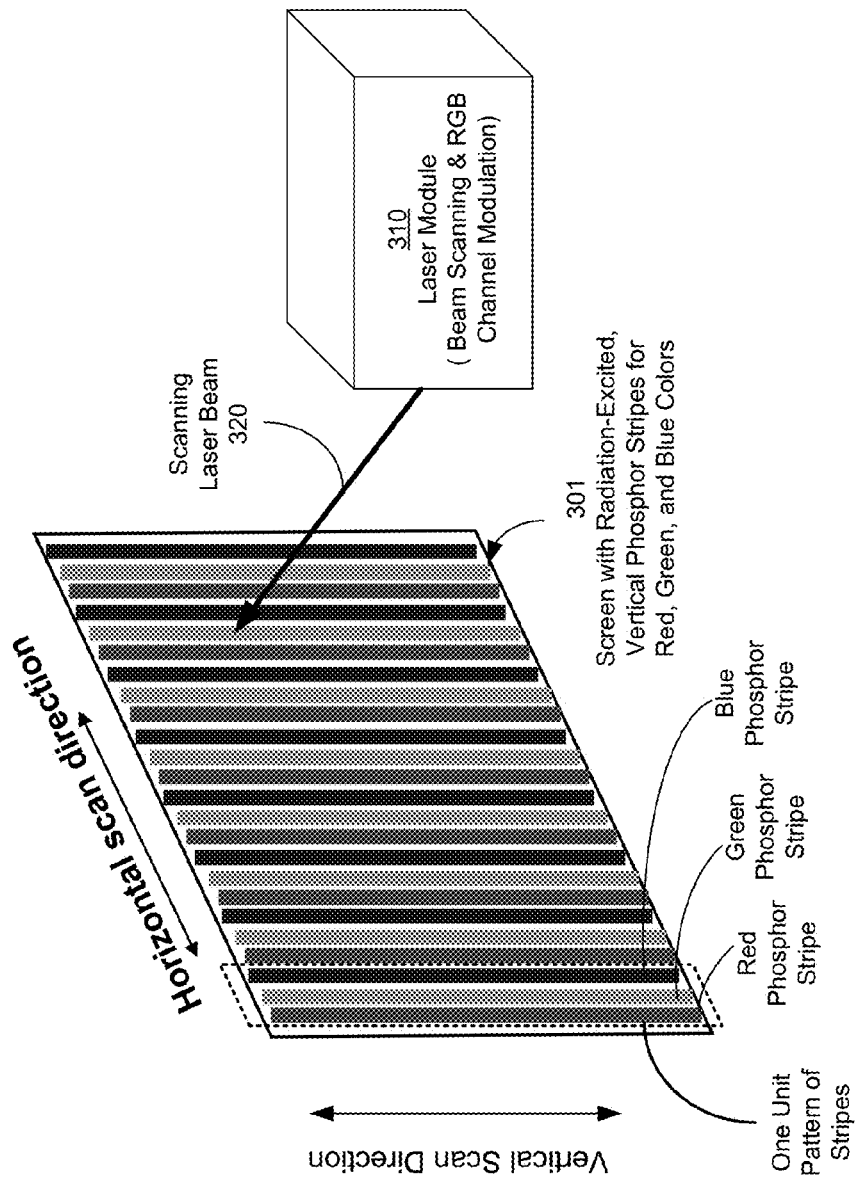

ural display brightness of the first stripe area during a normal display operation of the tiled display screen; and selecting a second stripe area of a second display screen of the multiple constituent display screens that butts the first display screen at the first edge of the first display screen to increase a display brightness level to the selected high level that is higher than a normal display brightness of the second stripe area during a normal display operation of the tiled display screen. In this method, the selected high level for the display brightness of the first stripe area and the second stripe area is selected to reduce visibility of a gap between the first and second display screens.

In another aspect, this document discloses an example of a display system that includes constituent display screens placed next to one another to form a tiled display screen array as a display screen which display images and two adjacent constituent display screens having a gap therebetween that does not produce images. This system includes a display controller in communication with the constituent display screens to send control signals to the constituent display screens to respectively display images that collectively form a final image for the tiled display screen array. The display controller selects a first stripe area of a first constituent display screen next to a first edge of the first constituent display screen to increase a display brightness level to a selected high level that is higher than a normal display brightness of the first stripe area during a normal display operation of the first constituent display screen, and selects a second stripe area of a second constituent display screen that is adjacent to the first constituent display screen at the first edge of the first constituent display screen to increase a display brightness level to a selected high level that is higher than a normal display brightness of the second stripe area during a normal display operation of the second constituent display screen.

In yet another aspect, this document describes an exemplary method for operating a tiled display screen that includes multiple constituent display screens placed adjacent to one another to form a large display screen array. This method includes selecting a first stripe of a first display screen of the multiple constituent display screens in proximity to a first edge of the first display screen, the first stripe comprising a first image region; selecting a second stripe of a second display screen of the multiple constituent display screens in proximity to a second edge adjacent to the first display screen at the first edge of the first display screen, the second edge comprising a second image region in proximity to the first image region; and adjusting a brightness level of the first image region relative to a brightness level of the second image region to reduce visibility of a gap between the first and second display screens.

These and other aspects, examples and implementations are described in greater detail in the drawings, the description and the claims.

BRIEF DESCRIPTION OF DRAWINGS

FIGS. 3, 4A, 4B, 5A and 5B show various aspects of scanning laser display systems that can be used as the constituent screens in the tiled display in FIG. 1.

DETAILED DESCRIPTION

A display screen in various screen designs has a frame of a certain width around the screen known as the bezel. The area in the bezel does not produce images and thus are outside the active display area of the display screen that produces images. In a tiled screen that arranges multiple such display screens with bezels adjacent to one another to form a large display area, the bezels of the display screens form a gap between two adjacent constituent screens and is a "dead" display area because images cannot be formed or displayed in this gap. In a tiled screen that arranges multiple display screens without bezels to form a larger display area, there tends to be a gap between two adjacent constituent screens that does not produce images. Such a gap between two adjacent constituent screens can be a straight line or a curved line and can render the large display area to have a tiled appearance, thus adversely affecting the image quality of the large screen formed by the constituent screens. This patent document describes examples of tiled display systems and implementations of apparatus, systems and techniques for forming large display screens by an array of separate screens with reduced visual effects caused by gaps between adjacent constituent screens.

Figure 1:
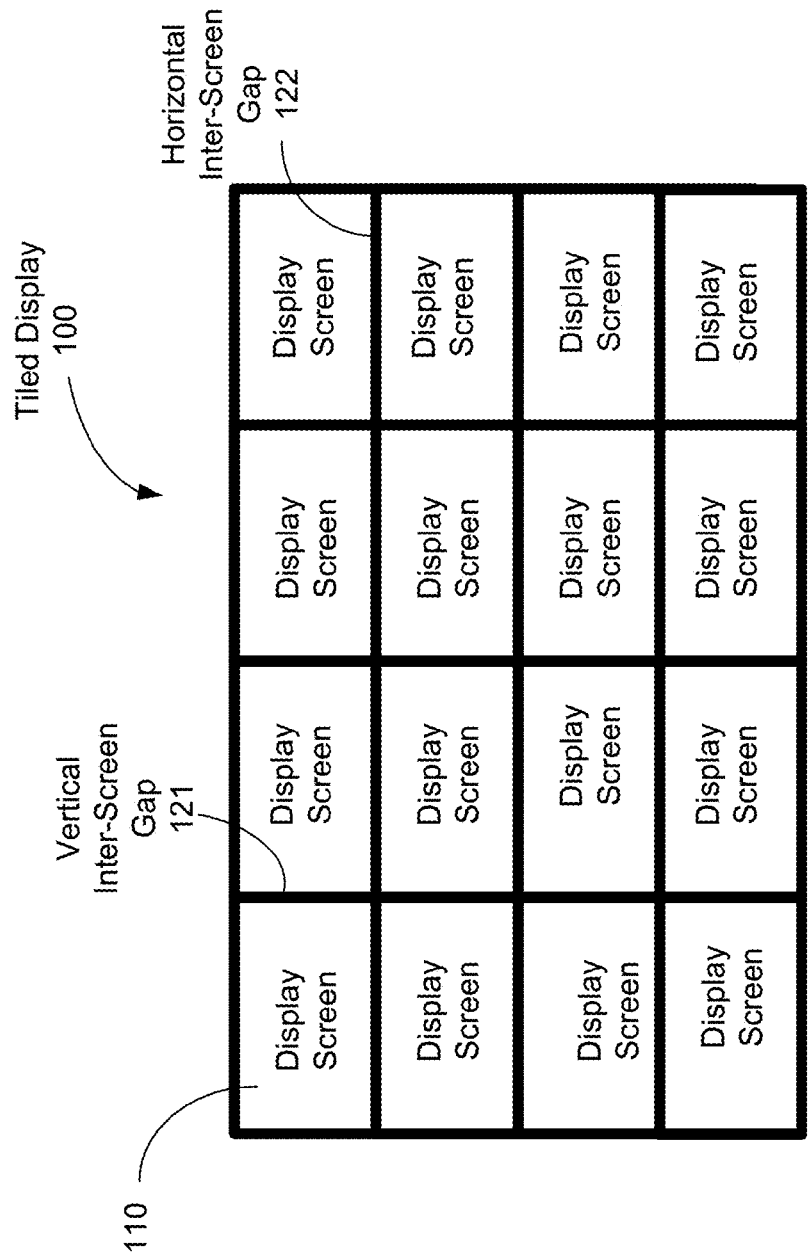
FIG. 1 shows an example of a tiled display with multiple constituent display screens.

FIG. 1 shows an example of a tiled display screen 100 formed by multiple constituent display screens 110 placed next to one another to form a display screen array. Two adjacent screens 110 butt to each other and are inevitably separated by an inter-screen gap that does not display images. As illustrated, an inter-screen gap along the vertical direction of the screen is a vertical gap 121 and an inter-screen gap along the horizontal direction of the screen is a horizontal gap 122. In other examples, a gap between two adjacent constituent screens may be curved. The screens can be designed to reduce the physical size of each gap but it can be difficult to completely eliminate this gap for screens 110 using various screen technologies. Such gaps 121 and 122 tend to be visible to viewers and separate the full image of the tiled screen into visible grids.

Figure 2:
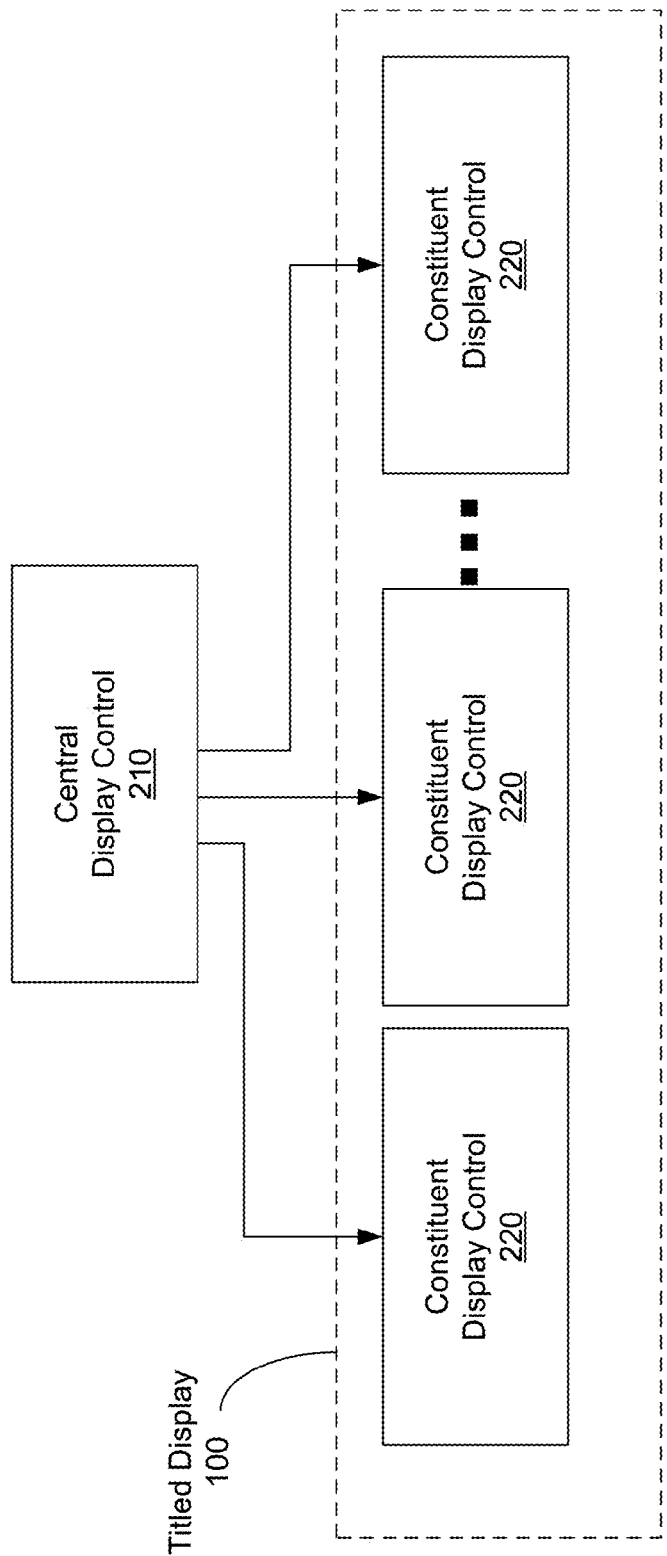
FIG. 2 shows an example of a control for the tiled display in FIG. 1.

FIG. 2 shows an example of the control system for the tiled screen 100 in FIG. 1. In this example, each constituent display screen 110 has its own display control 220 that controls the operations of each display screen 110. A central control 210 for the tiled display 100 is connected in communication with the display controls 220 for the constituent display screens 110 and control each screen 110 to display a fraction or portion of the full image displayed by the tiled screen 100. The central control 210 can be programmed to control selected areas of each screen 110 that are on a border with another adjacent screen 110 to have a higher display brightness to reduce the visibility of the gap 121 or 122 between two adjacent screens 110.

In one aspect, a method is described for operating a tiled display screen formed by multiple constituent display screens placed next to one another to form a display screen array. This method includes selecting a first stripe area of a first display screen of the multiple constituent display screens next to a first edge of the first display screen to increase a display brightness level to a selected high level that is higher than a normal display brightness of the first stripe area during a normal display operation of the tiled display screen; and selecting a second stripe area of a second display screen of the multiple constituent display screens that butts the first display screen at the first edge of the first display screen to increase a display brightness level to the selected high level that is higher than a normal display brightness of the second stripe area during a normal display operation of the tiled display screen. The selected high level for the display brightness of the first stripe area and the second stripe area is selected to reduce visibility or visual appearance of a gap at the first edge and the second edge between the first and second display screens.

The multiple constituent display screens can be implemented by various screen designs, including but not limited to, liquid crystal display (LCD) screens, plasma display screens, organic light emitting diode (OLED) display screens, rear projection display screens, and scanning laser beam display screens.

The scanning laser beam display screens can be implemented by examples shown in FIGS. 3 through 5B that use screens with light-emitting materials, such as phosphor and fluorescent materials, to emit light under optical excitation to produce images. In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Examples described in this document use screens with parallel color phosphor stripes for emitting light in red, green, blue to illustrate various features of the laser-based displays.

Phosphor materials are one type of light-emitting materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described here use at least one scanning laser beam to excite color light-emitting materials deposited on a screen to produce visible color images. The scanning laser beam is the pump light at a pump wavelength different from the emitted visible light and is modulated to carry images in red, green and blue colors or in other visible colors. The scanning laser beam is controlled in such a way that the scanning laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 3 illustrates an example of a laser-based scanning beam display system using a screen having color phosphor stripes. Alternatively, color phosphor dots may also be used to define the image pixels on the screen. The system includes a laser module 310 to produce and project at least one scanning laser beam 320 onto a screen 301. The screen 301 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 3 as red, green and blue. Other color sequences may also be used. The laser beam 320 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 310 can include one or more lasers such as UV diode lasers to produce the beam 320, a beam scanning mechanism to scan the beam 320 horizontally and vertically to render one image frame at a time on the screen 301, and a signal modulation mechanism to modulate the beam 320 to carry the information for image channels for red, green and blue colors. Such display systems may be configured as rear projection systems where the viewer and the laser module 310 are on the opposite sides of the screen 301. Alternatively, such display systems may be configured as front projection systems where the viewer and laser module 310 are on the same side of the screen 301.

Figure 4A:
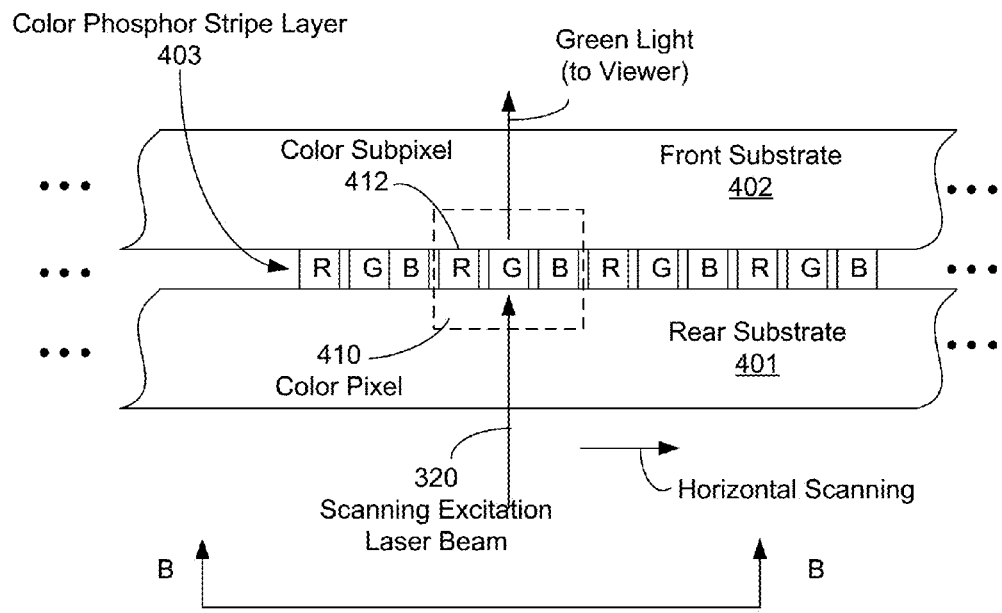

FIG. 4A shows an exemplary design of the screen 301 in FIG. 1. The screen 301 may include a rear substrate 401 which is transparent to the scanning laser beam 320 and faces the laser module 310 to receive the scanning laser beam 320. A second front substrate 402, is fixed relative to the rear substrate 401 and faces the viewer in a rear projection configuration. A color phosphor stripe layer 403 is placed between the substrates 401 and 402 and includes phosphor stripes. The color phosphor stripes for emitting red, green and blue colors are represented by "R", "G" and "B," respectively. The front substrate 402 is transparent to the red, green and blue colors emitted by the phosphor stripes. The substrates 401 and 402 may be made of various materials, including glass or plastic panels. Each color pixel includes portions of three adjacent color phosphor stripes in the horizontal direction and its vertical dimension is defined by the beam spread of the laser beam 320 in the vertical direction. As such, each color pixel includes three subpixels of three different colors (e.g., the red, green and blue). The laser module 310 scans the laser beam 120 one horizontal line at a time, e.g., from left to right and from top to bottom to fill the screen 301. The laser module 310 is fixed in position relative to the screen 301 so that the scanning of the laser beam 320 can be controlled in a predetermined manner to ensure proper alignment between the laser beam 320 and each pixel position on the screen 301.

Figure 4B:
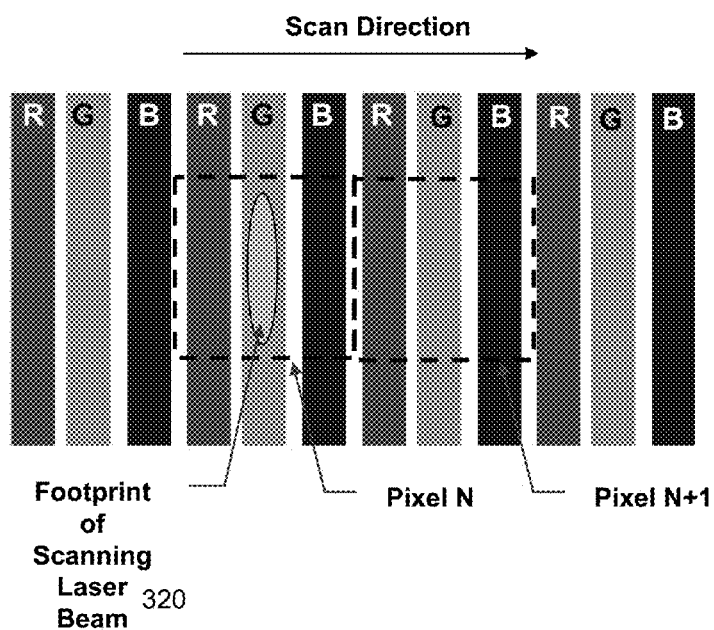

In FIG. 4A, the scanning laser beam 320 is directed at the green phosphor stripe within a pixel to produce green light for that pixel. FIG. 4B further shows the operation of the screen 401 in a view along the direction B-B perpendicular to the surface of the screen 401. Since each color stripe is longitudinal in shape, the cross section of the laser beam 320 may be shaped to be elongated along the direction of the stripe to maximize the fill factor of the beam within each color stripe for a pixel. This may be achieved by using a beam shaping optical element in the laser module 310. A laser source that is used to produce the scanning laser beam 320 that excites a phosphor material on the screen 301 is included in the laser module 310 and may be a single mode laser or a multimode laser. The laser beam 320 may be a single mode along the direction perpendicular to the elongated direction of the phosphor stripes to have a small beam spread that is confined by the width of each phosphor stripe. Along the elongated direction of the phosphor stripes, this laser beam 320 may have multiple modes to spread over a larger area than the beam spread in the direction across the phosphor stripe. This use of a laser beam with a single mode in one direction to have a small beam footprint on the screen 301 and multiple modes in the perpendicular direction to have a larger footprint on the screen 301 allows the laser beam 320 to be shaped to fit the elongated color subpixel on the screen 301 and to provide sufficient laser power in the beam via the multimodes to ensure sufficient brightness of the screen 301.

Figure 5A:
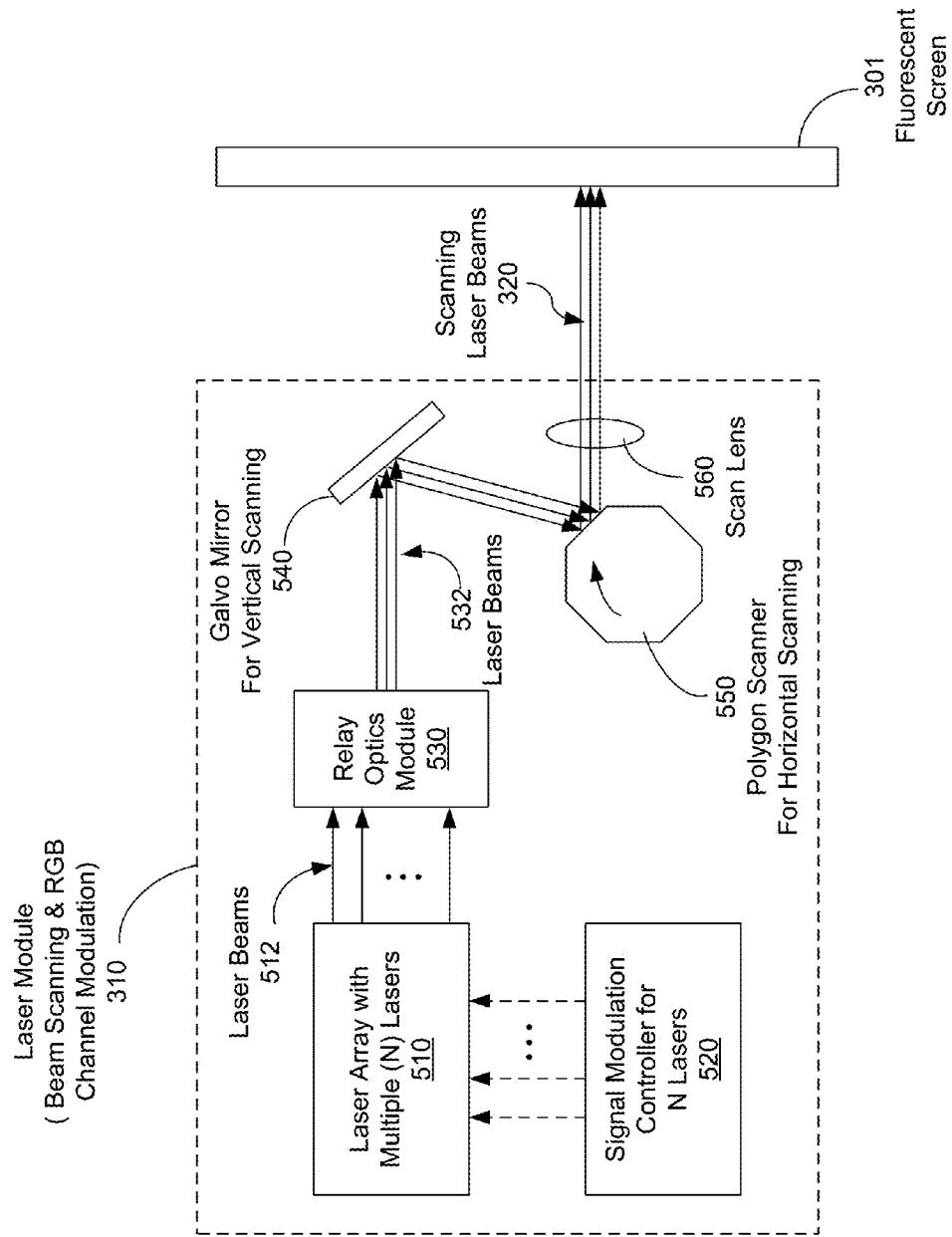

Referring now to FIG. 5A, an example implementation of the laser module 310 in FIG. 3 is illustrated. A laser array 510 with multiple lasers is used to generate multiple laser beams 512 to simultaneously scan the screen 301 for enhanced display brightness. A signal modulation controller 520 is provided to control and modulate the lasers in the laser array 510 so that the laser beams 512 are modulated to carry the image to be displayed on the screen 301. The signal modulation controller 520 can include a digital image processor that generates digital image signals for the three different color channels and laser driver circuits that produce laser control signals carrying the digital image signals. The laser control signals are then applied to modulate the lasers, e.g., the currents for laser diodes, in the laser array 510.

The beam scanning can be achieved by using a scanning mirror 540 such as a galvo mirror for the vertical scanning and a multi-facet polygon scanner 550 for the horizontal scanning. A scan lens 560 can be used to project the scanning beams form the polygon scanner 550 onto the screen 301. The scan lens 560 is designed to image each laser in the laser array 510 onto the screen 301. Each of the different reflective facets of the polygon scanner 550 simultaneously scans N horizontal lines where N is the number of lasers. In the illustrated example, the laser beams are first directed to the galvo mirror 540 and then from the galvo mirror 540 to the polygon scanner 550. The output scanning beams 320 are then projected onto the screen 301. A relay optics module 530 is placed in the optical path of the laser beams 512 to modify the spatial property of the laser beams 512 and to produce a closely packed bundle of beams 532 for scanning by the galvo mirror 540 and the polygon scanner 550 as the scanning beams 320 projected onto the screen 301 to excite the phosphors and to generate the images by colored light emitted by the phosphors.

The laser beams 320 are scanned spatially across the screen 301 to hit different color pixels at different times. Accordingly, each of the modulated beams 320 carries the image signals for the red, green and blue colors for each pixel at different times and for different pixels at different times. Hence, the beams 320 are coded with image information for different pixels at different times by the signal modulation controller 520. The beam scanning thus maps the time-domain coded image signals in the beams 120 onto the spatial pixels on the screen 301. For example, the modulated laser beams 320 can have each color pixel time equally divided into three sequential time slots for the three color subpixels for the three different color channels. The modulation of the beams 320 may use pulse modulation techniques to produce desired grey scales in each color, a proper color combination in each pixel, and desired image brightness.

In one implementation, the multiple beams 320 are directed onto the screen 301 at different and adjacent vertical positions with two adjacent beams being spaced from each other on the screen 301 by one horizontal line of the screen 301 along the vertical direction. For a given position of the galvo mirror 540 and a given position of the polygon scanner 550, the beams 320 may not be aligned with each other along the vertical direction on the screen 301 and may be at different positions on the screen 301 along the horizontal direction. The beams 320 can only cover one portion of the screen 301. At a fixed angular position of the galvo mirror 540, the spinning of the polygon scanner 550 causes the beams 320 from N lasers in the laser array 510 to scan one screen segment of N adjacent horizontal lines on the screen 301. At end of each horizontal scan over one screen segment, the galvo mirror 540 is adjusted to a different fixed angular position so that the vertical positions of all N beams 320 are adjusted to scan the next adjacent screen segment of N horizontal lines. This process iterates until the entire screen 301 is scanned to produce a full screen display.

In the above example of a scanning beam display system shown in FIG. 5A, the scan lens 560 is located downstream from the beam scanning devices 540 and 550 and focuses the one or more scanning excitation beams 320 onto the screen 301. This optical configuration is referred to as a "pre-objective" scanning system. In such a pre-objective design, a scanning beam directed into the scan lens 560 is scanned along two orthogonal directions. Therefore, the scan lens 560 is designed to focus the scanning beam onto the screen 301 along two orthogonal directions. In order to achieve the proper focusing in both orthogonal directions, the scan lens 560 can be complex and, often, are made of multiples lens elements. In one implementation, for example, the scan lens 560 can be a two-dimensional f-theta lens that is designed to have a linear relation between the location of the focal spot on the screen 301 and the input scan angle (theta) when the input beam is scanned around each of two orthogonal axes perpendicular to the optic axis of the scan lens 560. In such a f-theta lens, the location of the focal spot on the screen is a proportional to the input scan angle (theta).

The two-dimensional scan lens 560 such as a f-theta lens in the pre-objective configuration can exhibit optical distortions along the two orthogonal scanning directions which cause beam positions on the screen 301 to trace a curved line. Hence, an intended straight horizontal scanning line on the screen 301 becomes a curved line. The distortions caused by the 2-dimensional scan lens 560 can be visible on the screen 301 and thus degrade the displayed image quality. One way to mitigate the bow distortion problem is to design the scan lens 560 with a complex lens configuration with multiple lens elements to reduce the bow distortions. The complex multiple lens elements can cause the final lens assembly to depart from desired f-theta conditions and thus can compromise the optical scanning performance. The number of lens elements in the assembly usually increases as the tolerance for the distortions decreases. However, such a scan lens with complex multiple lens elements can be expensive to fabricate.

To avoid the above distortion issues associated with a two-dimensional scan lens in a pre-objective scanning beam system, the following sections describe examples of a post-objective scanning beam display system, which can be implemented to replace the two-dimensional scan lens 360 with a simpler, less expensive 1-dimensional scan lens. U.S. patent application Ser. No. 11/742,014 entitled "POST-OBJECTIVE SCANNING BEAM SYSTEMS" and filed on Apr. 30, 2007 (U.S. Patent Publication No. US20080247020A1 dated Oct. 8, 2008) describes examples of post-objective scanning beam systems suitable for use with phosphor screens described in this application and is incorporated by reference as part of the specification of this application. The screen designs described in this application can be used in both post-objective and pre-objective scanning beam display systems.

Figure 5B:
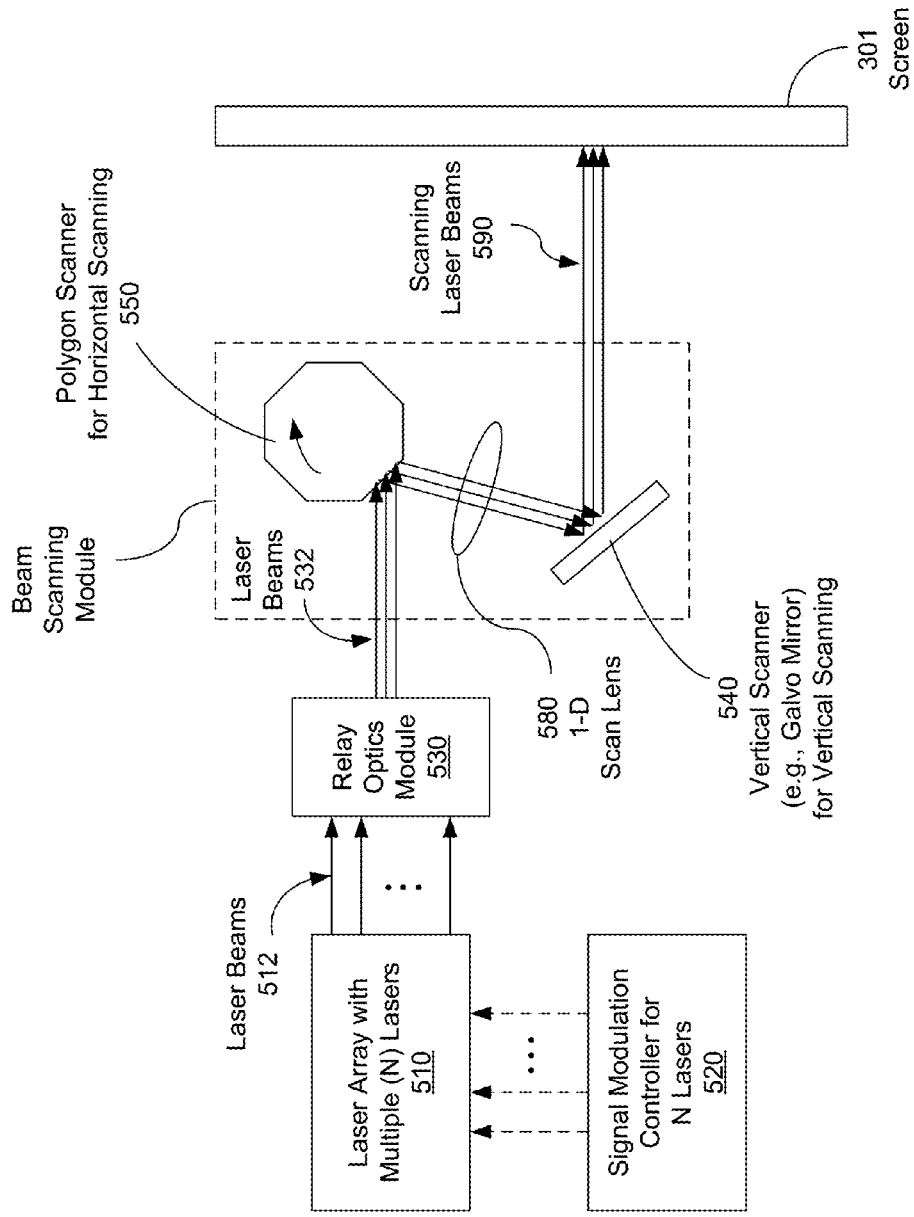

FIG. 5B shows an example implementation of a post-objective scanning beam display system based on the system design in FIG. 3. A laser array 510 with multiple lasers is used to generate multiple laser beams 512 to simultaneously scan a screen 301 for enhanced display brightness. A signal modulation controller 520 is provided to control and modulate the lasers in the laser array 510 so that the laser beams 512 are modulated to carry the image to be displayed on the screen 301. The beam scanning is based on a two-scanner design with a horizontal scanner such as a polygon scanner 550 and a vertical scanner such as a galvanometer scanner 540. Each of the different reflective facets of the polygon scanner 550 simultaneously scans N horizontal lines where N is the number of lasers. A relay optics module 530 reduces the spacing of laser beams 512 to form a compact set of laser beams 532 that spread within the facet dimension of the polygon scanner 550 for the horizontal scanning. Downstream from the polygon scanner 550, there is a 1-D horizontal scan lens 580 followed by a vertical scanner 540 (e.g., a galvo mirror) that receives each horizontally scanned beam 532 from the polygon scanner 350 through the 1-D scan lens 580 and provides the vertical scan on each horizontally scanned beam 532 at the end of each horizontal scan prior to the next horizontal scan by the next facet of the polygon scanner 550. The vertical scanner 540 directs the 2-D scanning beams 590 to the screen 301.

Under this optical design of the horizontal and vertical scanning, the 1-D scan lens 580 is placed downstream from the polygon scanner 550 and upstream from the vertical scanner 540 to focus each horizontal scanned beam on the screen 301 and minimizes the horizontal bow distortion to displayed images on the screen 301 within an acceptable range, thus producing a visually "straight" horizontal scan line on the screen 301. Such a 1-D scan lens 580 capable of producing a straight horizontal scan line is relatively simpler and less expensive than a 2-D scan lens of similar performance. Downstream from the scan lens 580, the vertical scanner 540 is a flat reflector and simply reflects the beam to the screen 301 and scans vertically to place each horizontally scanned beam at different vertical positions on the screen 301 for scanning different horizontal lines. The dimension of the reflector on the vertical scanner 540 along the horizontal direction is sufficiently large to cover the spatial extent of each scanning beam coming from the polygon scanner 550 and the scan lens 580. The system in FIG. 5B is a post-objective design because the 1-D scan lens 580 is upstream from the vertical scanner 540. In this particular example, there is no lens or other focusing element downstream from the vertical scanner 540.

In the post-objective system in FIG. 5B, the distance from the scan lens to a location on the screen 301 for a particular beam varies with the vertical scanning position of the vertical scanner 540. Therefore, when the 1-D scan lens 580 is designed to have a fixed focal distance along the straight horizontal line across the center of the elongated 1-D scan lens, the focal properties of each beam change with the vertical scanning position of the vertical scanner 580 to maintain consistent beam focusing on the screen 301. In this regard, a dynamic focusing mechanism can be implemented to adjust convergence of the beam going into the 1-D scan lens 580 based on the vertical scanning position of the vertical scanner 540.

For example, in the optical path of the one or more laser beams from the lasers to the polygon scanner 550, a stationary lens and a dynamic refocus lens can be used in a combination as the dynamic focusing mechanism. Each beam is focused by the dynamic focus lens at a location upstream from the stationary lens. When the focal points of the two lenses coincide with each other, the output light from the lens is collimated. Depending on the direction and amount of the deviation between the focal points of the lenses, the output light from the collimator lens toward the polygon scanner 550 can be either divergent or convergent. Hence, as the relative positions of the two lenses along their optic axis are adjusted, the focus of the scanned light on the screen 101 can be adjusted. A refocusing lens actuator can be used to adjust the relative position between the lenses in response to a control signal. In this particular example, the refocusing lens actuator is used to adjust the convergence of the beam directed into the 1-D scan lens 580 along the optical path from the polygon scanner 550 in synchronization with the vertical scanning of the vertical scanner 540. The vertical scanner 540 in FIG. 5B scans at a much smaller rate than the scan rate of the first horizontal scanner 550 and thus a focusing variation caused by the vertical scanning on the screen 301 varies with time at the slower vertical scanning rate. This allows a focusing adjustment mechanism to be implemented in the system of FIG. 3 with the lower limit of a response speed at the slower vertical scanning rate rather than the high horizontal scanning rate.

The stripe design in FIG. 4B for the fluorescent screen 301 in FIGS. 3, 5A and 5B can be implemented in various configurations. FIG. 4A shows one example which places the fluorescent layer 403 such as a color phosphor stripe layer between two substrates 401 and 402. In a rear projection system, it is desirable that the screen 301 couple as much light as possible in the incident scanning excitation beam 320 into the fluorescent layer with while maximizing the amount of the emitted light from the fluorescent layer that is directed towards the viewer side. A number of screen mechanisms can be implemented, either individually or in combination, in the screen 301 to enhance the screen performance, including efficient collection of the excitation light, maximization of fluorescent light directed towards the viewer side, enhancement of the screen contrast and reduction of the screen glare. The structure and materials of the screen 301 can be designed and selected to meet constraints on cost and other requirements for specific applications.

Referring back to FIG. 1, when the screens 301 or other screens are used as the screens 110 to form the tiled large display screen 100, there is a physical separation between the tiled display screens 110 in the tiled screen 100. This physical separation reduces the quality of the image. Such a separation is a dead area that does not produce images and is unavoidable in many tiled screen designs although smaller inter-screen gaps may be achieved to reduce the separation and to improve the image quality. Human eyes have certain visual limitations and such limitations can be used to produce a seamless image perceived by viewers. The selective boosting brightness at edges of constituent screens in a tiled screen can be designed to mask appearance of a dead area by presenting a "processed image" instead of a normal image to the viewer. The controller 520 for each individual screen in FIG. 5A or 5B, for example, can be controlled as the constituent display control 220 in FIG. 2 to superimpose the boost signal in the laser beams 320 that increase the optical power of the laser beams 320 at selected pixel locations near a border with another screen.

Figure 6:
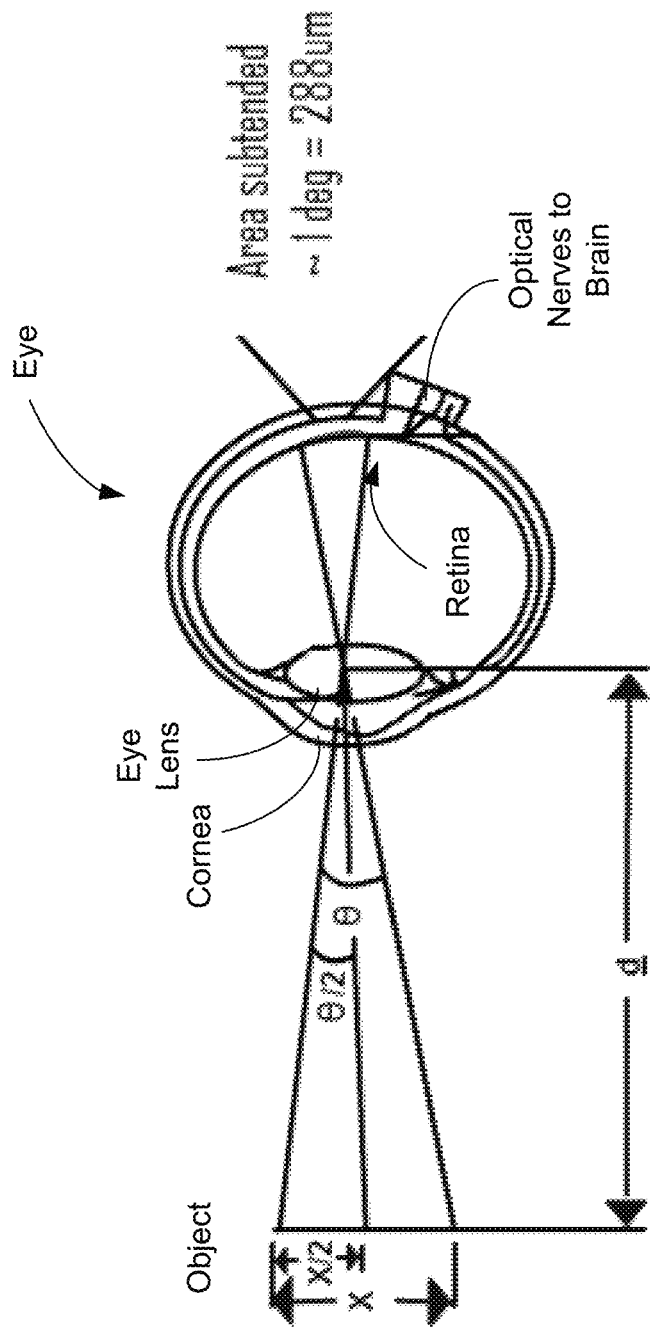
FIG. 6 illustrates an example of image formation in an eye.

The standard definition of normal visual acuity (e.g., 20/20 vision) is the ability to resolve a spatial pattern separated by a visual angle of one minute of arc. Since one degree contains sixty minutes, a visual angle of one minute of arc is 1/60 of a degree. The spatial resolution limit of the eye is derived from the fact that one degree of a scene is projected across 288 μm of the retina by the eye's lens. FIG. 6 illustrates this aspect of a human eye. The area with a dimension of 288 μm on the retina can have about 120 color sensing cone cells. Thus, if more than 120 alternating black and white lines are crowded side-by-side in a single degree of viewing space, such alternating black and white lines will appear as a single gray mass or area to the human eye.

For the case of normal visual acuity the angle Theta shown in FIG. 6 is 1/60 of a degree. By bisecting this angle, a right triangle can be formed with an angle Theta/2 that is 1/120 of a degree. This right triangle can be used to calculate the distance X/2 on the object for a given distance d between the object and the eye:

$X/2=d(\tan \text{Theta}/2)$

Under these circumstances the human eye averages the light spatially. The above calculations are approximate estimates and may vary from person to person. Studies of human eye functions, such as spatial resolution, contrast sensitivity and spatial summation capability, can be used to better understand this visual limitation of human eyes and to assist the designs of tiled screens.

Figure 7:
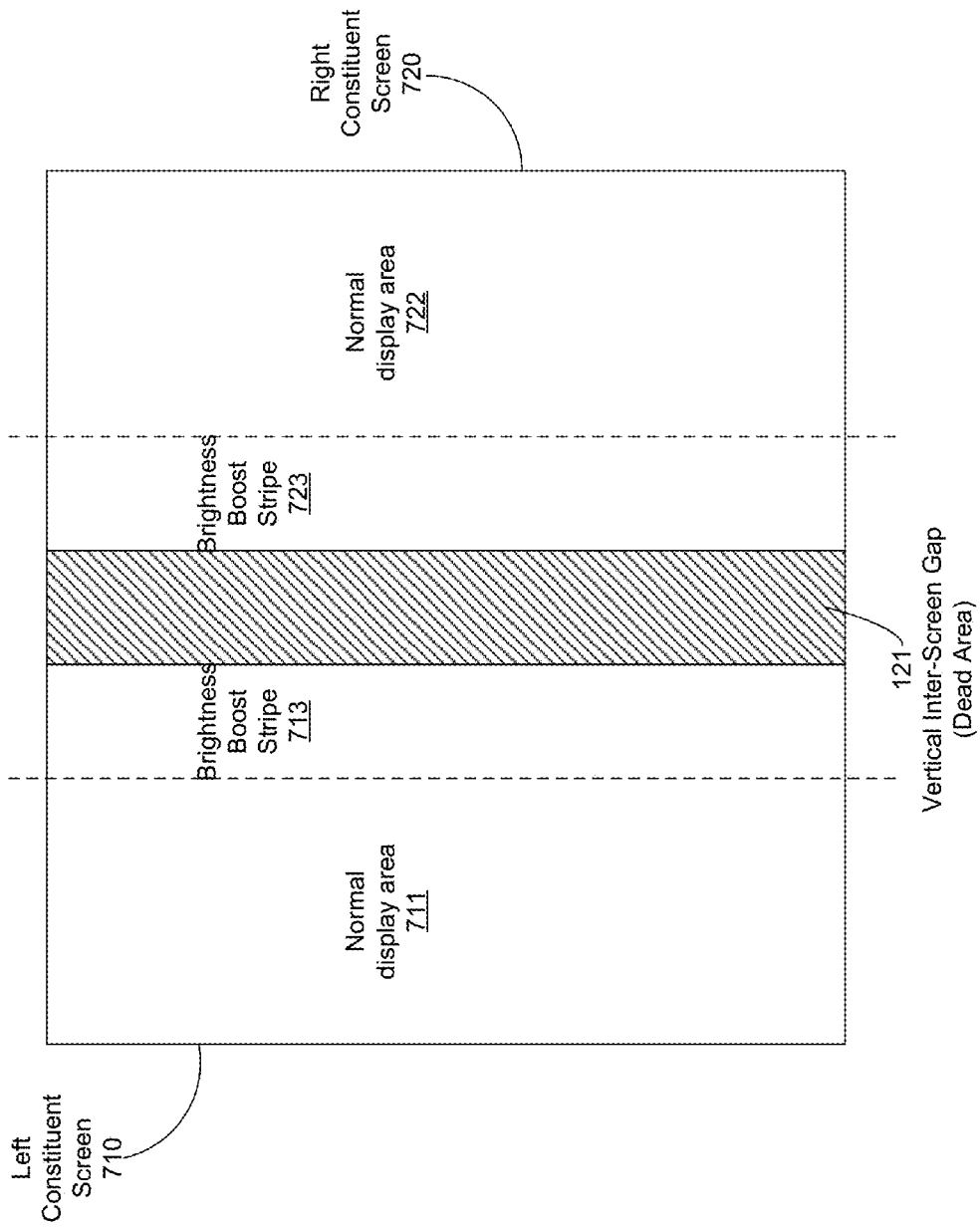
FIGS. 7 and 8 show examples of operating tiled displays to reduce visibility of a gap between two adjacent constituent screens.

FIG. 7 shows a partial view of two selected adjacent constituent screens 710 and 720 in the tiled display shown FIG. 1. A first stripe 713 of the left display screen 710 next to an edge of the left display screen 710 is selected to operate at a display brightness level to a selected high level that is higher than a normal display brightness of the first stripe 713 during a normal display operation of the tiled display screen. Similarly, on the other side the gap 121, a second stripe 723 of the right display screen 720 that butts the left display screen 710 at the edge is selected to operate at a display brightness level to the selected high level that is higher than a normal display brightness of the second stripe 723 during a normal display operation of the tiled display screen. The selected high level for the display brightness of the first stripe 713 and the second stripe 723 is selected to reduce visibility of the gap 121 between the left and right display screens 710 and 720.

Figure 8:
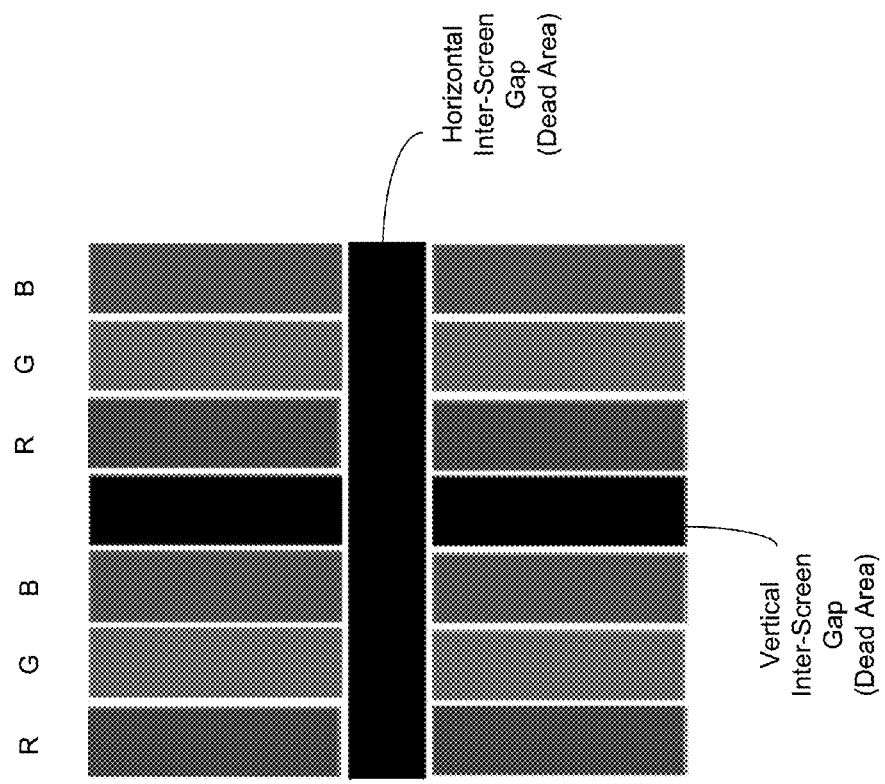

Referring to the screens in FIGS. 3, 4A and 4B with light-emitting stripes, consider sizes of a dead area and a pixel area represented by two area parameters DA and PA, respectively. FIG. 8 shows a partial view of a tiled screen based on such screens. In case of a bezel the actual display at the cross section would have looked like what is shown in FIG. 8. Assume the screen design is designed with a pixel size of PA=3 DA, horizontally and vertically, and the bezel is assumed to be in the black color, the distance beyond which the gap appears less visible can be computed. The dead area of size "dh" is smaller than the recognized spatial resolution at the following distance, Distance from monitor=$dh/\tan(1/120 \text{ deg})$.

Example calculations are as given below, for a standard laptop with a 14.1-inch LCD screen at a resolution of 1280×800 pixels and with a pixel height of approximately 0.26 mm. calculations are given below,

| Feature height | Factor | Distance in mm | Distance in ft |
| --- | --- | --- | --- |
| 0.5 | 0.000145 | 3437.746747 | 11.27869669 |
| 0.2624 | 0.000145 | 1804.129493 | 5.919060024 |

At this distance human eye cannot see the feature and sums the color in a critical area determined by the spatial summation. Based on this, the central control for the tiled display can be programmed to include a control algorithm to boost the neighboring pixels in either direction of the gap to mask the dead area at the specified viewing distance.

Given the size of dead area (DA) and the pixel area (PA), the boost required by the neighboring pixels is as follows. Let PixelLeft and PixelRight be the pixel brightness values of two neighboring pixels. The average light output L per area, considering the gamma correction function for the nonlinear reproduction of light of the screen under an applied signal (e.g., pump powder of the laser beam 320 in FIG. 3), is $$L = \text{Gamma}(((\text{PixelLeft}+\text{PixelRight})/2))/(2*PA+DA) \quad \text{EQ (1)}$$

In order to mask the dead area, the same amount of light is set to be emitted by PixelLeft and PixelRight:

$$L = \text{Gamma}(\text{Newpixel})/(2*PA) \quad \text{EQ (2)}$$

New value of the pixels can be found by solving the above equations. Since the gamma correction function is a power function, the ratio of "Newpixel/OldPixelValue" is a constant, indicating the same calculations for all grey levels:

New Pixel Value=Old Pixel Value*Boost, where Boost is a ratio calculated by solving EQ (1) and EQ (2).

The above boost design has several properties. When the pixel has an aspect ratio between the vertical and the horizontal directions that is greater or less than one, the above calculations for the boost to reduce the gap appearance for the vertical bezel and horizontal bezel are different. The cross-section of the bezel also needs re-calculated since the ratio between the light emitting area to the dead area changes from one tiled screen to another tiled screen due to variations in the size of the gap between two adjacent constituent screens. The locations and the numbers of pixels at the edges of two adjacent constituent screens to be boosted in their brightness can also made in more than one combination. For example, the neighboring pixels selected to boost may be 1×1, 2×1, 2×2, or other patches of pixels. For another example, pixels perpendicular to a bezel line between two adjacent constituent screens may be selected to boost.

The above algorithm can be applicable for various display devices with differing sub-pixel arrangements such as stripes as illustrated in FIGS. 3, 4A and 4B, pixel dots, and time multiplexed pixilated displays. A display controller for a tiled display screen, such as the central display control 210 and the controllers 220 of constituent screens in FIG. 2, can be programmed to perform the brightness boosting near a straight or curved border of a constituent screen with another constituent screen to reduce the visibility of the border to a viewer. In some implementations, the selected pixels near the gap in the first screen are set at an enhanced brightness at the same level as the selected pixels near the gap in the second, adjacent screen. In other implementations, the selected pixels near the gap in the first screen may be set at an enhanced brightness at a level different from that of the selected pixels near the gap in the second, adjacent screen. Yet in other implementations, a group of pixels adjacent to the gap in either one of the two adjacent constituent screens may be controlled to have variations in their brightness. For example, referring to FIG. 7, the pixels in the stripe 713 along the vertical gap 121 in the left screen 710 may vary in their brightness along the gap. This variation may depend on the images to be displayed locally near the gap 121 and thus may be dynamically altered as the local images vary during the display operation.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on the disclosure of this document.

What is claimed is:

1. A method for operating a tiled display screen that includes multiple constituent display screens placed next to one another to form a display screen array as a display screen, wherein two adjacent constituent display screens define a gap therebetween that does not produce an image such that outer surfaces of the adjacent constituent display screens include a dead area that does not display an image, the method comprising:

selecting a first stripe area of a first display screen of the multiple constituent display screens next to a first edge of the first display screen, the first stripe area comprising one or more pixels corresponding to a first set of normal pixel brightness values;

sending signals to increase the first set of normal pixel brightness values to a first set of boosted pixel brightness values during display operation;

selecting a second stripe area of a second display screen of the multiple constituent display screens that abuts the first display screen at the first edge of the first display screen, the second stripe area comprising one or more pixels corresponding to a second set of normal pixel brightness values; and sending signals to increase the second set of normal pixel brightness values to a second set of boosted pixel brightness values during display operation, wherein the first and second sets of boosted pixel values are varied dynamically based on images to be displayed locally near the gap between the first and second display screens, the first and second sets of boosted pixels being located next to the gap such that the outer surface corresponding to each of the first and second display screens includes (i) a boosted brightness area, laterally adjacent to the dead area where no light is emitted, that emits light of boosted brightness and (ii) a normal brightness area that emits light of normal brightness.

2. The method as in claim 1, wherein:

the multiple constituent display screens are scanning laser beam display screens, and the method comprises controlling optical power of each scanning laser beam when being scanned in the first and second stripe areas to achieve the boosted pixel brightness values of the first stripe area and the second stripe area to reduce visibility of the gap between the first and second display screens.

3. The method as in claim 1, wherein:
each constituent display screen comprises parallel stripes of light-emitting materials that emit visible light by absorbing pump light at a different wavelength from the emitted visible light, and
the method comprises controlling optical power of the pump light in optically pumping the first and second stripe areas to achieve the boosted pixel brightness values of the first stripe area and the second stripe area to reduce visibility of the gap between the first and second display screens.

4. The method as in claim 1, wherein selecting the first stripe area includes selecting one or more first edge pixels, and wherein selecting the second stripe area includes selecting one or more second edge pixels.

5. The method as in claim 4, wherein a ratio of an edge pixel brightness after boosting the pixel value to an edge pixel brightness before boosting the pixel value is constant.

6. The method as in claim 1, wherein dynamically varying the first and second sets of boosted pixel values based on images to be displayed locally near the gap between the first and second display screens includes dynamically varying in response to a Gamma correction function.

7. The method of claim 1, wherein the first set of pixel brightness values is increased to the first set of boosted pixel brightness values according to a boost value, and wherein the second set of pixel brightness values is increased to the second set of boosted pixel brightness values according to the same boost value.

8. The method of claim 7, wherein the boost value is a function of an area of a portion of the gap between the one or more pixels of the first stripe area and the one or more pixels of the second stripe area.

9. The method of claim 8, wherein the boost value is a function of areas of the one or more pixels of the first and second stripe areas.

10. A method for operating a tiled display screen comprising multiple constituent display screens placed adjacent to one another to form a large display screen array, wherein two adjacent constituent display screens define a gap therebetween that does not produce an image such that outer surfaces of the adjacent constituent display screens include a dead area that does not display an image, the method comprising:
selecting a first stripe of a first display screen of the multiple constituent display screens in proximity to a first edge of the first display screen, the first stripe comprising a first image region having one or more pixels corresponding to a first set of pixel brightness values;
selecting a second stripe of a second display screen of the multiple constituent display screens in proximity to a second edge adjacent to the first display screen at the first edge of the first display screen, the second edge comprising a second image region in proximity to the first image region having one or more pixels corresponding to a second set of pixel brightness values; and
sending signals to dynamically adjust the first set of pixel brightness values relative to the second set of pixel brightness values based on local images to be displayed to reduce visibility of a gap between the first and second display screens, the first set of adjusted pixels being located next to the gap such that the outer surface corresponding to the first display screen includes an adjusted brightness area, laterally adjacent to the dead area where no light is emitted, that emits light of adjusted brightness.

11. The method as in claim 10, comprising:
adjusting the pixel brightness values corresponding to both the first and the second image regions.

12. The method as in claim 10, comprising:
controlling the first and second sets of pixel brightness values to be the same.

13. The method as in claim 10, comprising:
controlling the first and second sets of pixel brightness values to be different.

14. The method as in claim 10, wherein:
the first stripe is along a direction perpendicular to the gap between the first and second display screens.

15. The method as in claim 10, wherein:
the first stripe is along a direction parallel to the gap between the first and second display screens.

16. The method as in claim 10, comprising:
controlling the first set of pixel brightness values such that a first pixel brightness value at a first location of the first stripe varies from a second pixel brightness value at a second location of the first stripe.

* * * * *